United States Patent
Dai et al.

(10) Patent No.: US 8,046,178 B2
(45) Date of Patent: Oct. 25, 2011

(54) DEFECT DETECTION SYSTEM FOR IDENTIFYING DEFECTS IN WELD SEAMS

(75) Inventors: Fan Dai, Zwingenberg (DE); Björn Matthias, Bad Schönborn (DE); Sönke Kock, Västeras (SE)

(73) Assignee: ABB Research Ltd, Zurich (CH)

( * ) Notice: Subject to any disclaimer, the term of this patent is extended or adjusted under 35 U.S.C. 154(b) by 683 days.

(21) Appl. No.: 11/922,091

(22) PCT Filed: Jun. 12, 2006

(86) PCT No.: PCT/EP2006/005597
§ 371 (c)(1),
(2), (4) Date: Jul. 10, 2008

(87) PCT Pub. No.: WO2006/133875
PCT Pub. Date: Dec. 21, 2006

(65) Prior Publication Data
US 2009/0312958 A1    Dec. 17, 2009

(30) Foreign Application Priority Data
Jun. 13, 2005    (DE) .................. 10 2005 027 342

(51) Int. Cl.
*G01B 5/28* (2006.01)
*G01B 5/30* (2006.01)
(52) U.S. Cl. ........................................ 702/40; 702/36
(58) Field of Classification Search .............. 702/36, 702/40
See application file for complete search history.

(56) References Cited

U.S. PATENT DOCUMENTS

| 4,305,297 A * | 12/1981 | Ries et al. .............. 73/628 |
| 4,742,713 A * | 5/1988 | Abe et al. ............... 73/620 |
| 5,240,329 A | 8/1993 | Zinkosky |
| 5,978,090 A * | 11/1999 | Burri et al. ............. 356/613 |
| 6,024,273 A | 2/2000 | Ludewig et al. |
| 6,757,055 B1 | 6/2004 | Kluft |
| 6,937,329 B2 * | 8/2005 | Esmiller ................ 356/237.2 |
| 2004/0134970 A1 | 7/2004 | Den Boer et al. |
| 2010/0274391 A1 * | 10/2010 | Dai ....................... 700/259 |

OTHER PUBLICATIONS

International Search Report for PCT/EP2006/005597 dated Sep. 25, 2006.

* cited by examiner

*Primary Examiner* — Michael Nghiem
(74) *Attorney, Agent, or Firm* — Buchanan Ingersoll & Rooney PC

(57) ABSTRACT

A defect detection system identifies defects in weld seams. An exemplary system includes a scanner device, mounted on a displacement device of a processing unit and which can be displaced by the unit over at least one weld seam that is to be examined. The scanner unit scans the weld seam using a predefinable frequency, each scanning sweep being correlated with a time signal. The time signal is used to record the point in time when at least one location containing defects is scanned. An analysis module determines the co-ordinates of the defects from the signals that are obtained by the scanning sweeps and stores the co-ordinates of the defects and transmits them to a localisation module. The localisation module determines the spatial arrangement of the defects of the weld seam by evaluating a speed profile of the displacement device during the scanning sweeps, the time signal and the co-ordinates.

21 Claims, 4 Drawing Sheets

DEFECT DETECTION SYSTEM FOR IDENTIFYING DEFECTS IN WELD SEAMS

BACKGROUND

1. Field of Invention

The invention relates to an automatic defect detection system for automatic identification and evaluation of defects in weld seams, as is used by way of example for welding robots. The invention also relates to a method for operation of a system such as this.

2. Description of Related Art

The quality of a weld seam is normally admittedly recorded automatically by means of external optical identification systems, but the evaluation of the information for defect identification is carried out by an external computer system, and this is associated with a major time penalty. The information that is relevant for defect identification and assessment is transmitted to the computer system that is used for the defect identification, also referred to as the evaluation device, via, for example a serial interface, a fieldbus, an appliance network or analogue and/or digital input/output units. Special protocols which need to be adapted for the respectively used recording systems and robot systems are required for the communication between the recording system and the evaluation device.

SUMMARY

When processing the information relating to the quality of the weld seam by means of the conventional optical identification systems, the monitoring velocity is often too low or the scanning accuracy is too coarse to assess the quality of the weld seam for many applications, and this means that real-time monitoring of the weld seam is not feasible.

Defect detection and evaluation systems that are used nowadays do not allow direct use of the determined information relating to the quality of the weld seam, for example for controlling the welding device of the robot system, in order to react automatically and therefore within a very short time to defect causes.

Against the background of the described disadvantages, the invention is based on the object of specifying an automatic defect detection system for identification and for evaluation of defects in weld seams, which reduces the time period required to record and evaluate the defects, thus allowing real-time monitoring of the quality of the weld seams and reducing the time required to react to defect causes.

The defect detection system according to the invention for identifying and for evaluating defects in weld seams comprises a scanning apparatus which is fitted to a movement apparatus of a processing device, with the scanning apparatus being moveable by the movement apparatus over at least one weld seam to be examined.

The processing device is preferably a machine tool, a robot or a robot system, in particular a welding robot system.

According to the invention, the scanning apparatus is intended to scan the weld seam at a predeterminable frequency, on the one hand with the scanning apparatus being moveable over the weld seam to be examined and on the other hand with the weld seam being moveable with respect to the scanning apparatus. In this case, each scan is correlated with a time signal. The time of the scanning of at least one defective scan point is recorded with the time signal.

The time signal which characterizes the time of the scan and a signal which characterizes the velocity profile of the movement apparatus are produced by a control unit for the movement apparatus.

The scanning apparatus is connected to an analysis module which identifies and stores the coordinates of the defect locations from the scan signals obtained by means of the scans.

The analysis module interacts with a localization module which determines the spatial arrangement of the defects within the weld seam, for example the height, width and length of the weld seam, from the evaluation of a velocity profile of the movement apparatus during the scans, from the time signals associated with the defective scan points and the coordinates of the defect locations produced by the analysis module.

The analysis module and the localization module form image processing software which is integrated in a data processing device.

One advantageous refinement of the invention provides for defects to be recordable over a plurality of scans in order to determine the extent of a defect.

The image processing software is connected to the control unit for the processing device, which processes the determined spatial arrangement of the defects further and uses this, for example, to control the robot arm in order to rework the weld seam.

The connection of the defect recording and evaluation that is carried out by means of the analysis and localization module to a control unit for the processing device means that it is advantageously possible to use application software that is located in the control unit to automatically further process the information relating to the defects, in order to automatically react to defect causes and, for example, to repair the weld seams, in real-time conditions.

In a further advantageous refinement of the invention, the analysis module which is integrated in the data processing device and the localization module communicate with the control unit for the processing device via a standardized XML (extensible Markup Language) interface.

In an exemplary embodiment, a scanning apparatus which is fitted to a movement apparatus for a processing device is moved at a defined velocity over at least one weld seam to be examined, with the weld seam being scanned by means of the scanning apparatus at a predeterminable frequency, and with each scan being related to an associated time signal. The time of the scanning of at least one defective scan point is therefore recorded with the time signal.

The coordinates of the defect locations are determined and stored by means of an analysis module from the scan signals obtained by means of the scans.

The spatial arrangement of the defects in the weld seam is determined by means of a localization module by evaluation of a velocity profile of the movement apparatus during the, scans, of the time signal associated with the defective scan points, and of the coordinates of the defect locations produced by the analysis module.

The determined spatial arrangement of the defects is automatically transmitted to the control unit for the processing device, for further processing in real time.

The information which is made available to the application software for the control unit relating to the identified defects, in particular their spatial extent and arrangement on the weld seam to be examined, allow the control unit to react to the movement processes of the processing unit within a very short time.

The method according to the invention for automatic and faster identification and evaluation of defects in weld seams therefore improves the flexibility and productivity of the production of weld seams to a major extent.

The invention as well as advantageous refinements, improvements and further advantages of the invention will be explained and described in more detail with reference to the exemplary embodiments that are illustrated in the following figures, in which:

DETAILED DESCRIPTION

Figure 1:
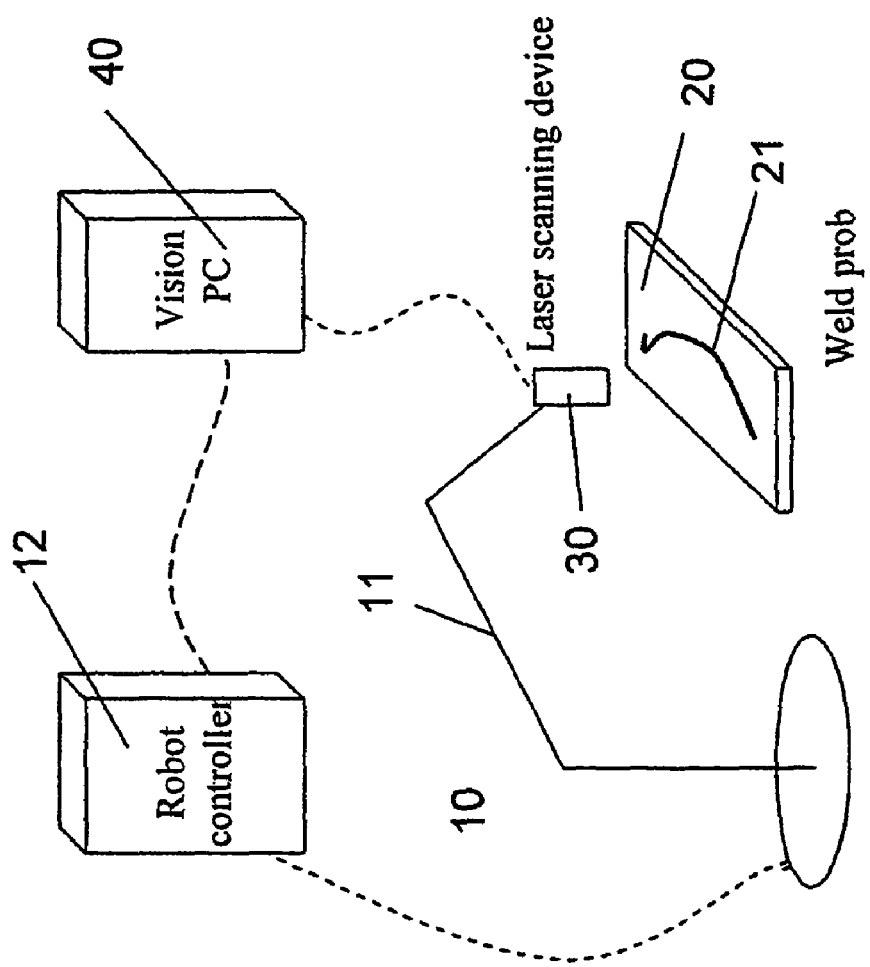
FIG. 1 shows one embodiment of the defect detection system according to the invention for identifying defects in weld seams, by way of example for a welding robot.

FIG. 1 shows one embodiment of the defect detection system according to the invention for identifying defects in weld seams 21 on a workpiece 20, by way of example for a welding robot 10 which has a control unit 12 for controlling the movements of a robot arm 11, and a scanning apparatus 30 in the form of a laser scanning apparatus. The scanning apparatus 30, which is fitted to the robot arm 11, is moved at a uniformly predeterminable velocity over the weld seam 21 to be examined and scans the weld seam 21 at a predeterminable frequency, preferably 500 Hz, with each scan being correlated with a time signal. The time signal therefore records the time at which the defective scan point was scanned, and this is also referred to in the following text as the defect or defect location.

The laser scanning apparatus 30 uses an optical high-speed link to communicate with a data processing device 40 in the form of a personal computer (PC).

The scan signals and time signals which are obtained by the scans and are transmitted from the laser scanning apparatus 30 to one in the PC 40 are evaluated by an analysis module integrated in the PC 40, and the coordinates of the defect locations are determined from this.

The analysis module is also designed to store the determined coordinates of the defect locations, and to transmit them to a localization module, which is likewise integrated in the PC 40.

The localization module is intended to determine the spatial arrangement of the defects in the weld seam 21 by evaluation of a velocity profile of the robot arm 11 during the scans, of the time signals associated with the defective scan points, and of the coordinates of the defect locations produced by the analysis module.

The localization module transmits the information relating to the spatial arrangement of the determined defect locations to the control unit 12 for the robot 10, which further processes the determined spatial arrangement of the defect locations by means of application software which is integrated in the control unit 12.

The analysis module and the localization module form image processing software, which is optionally also intended for operation and control of the scanning apparatus 30.

Figure 2:
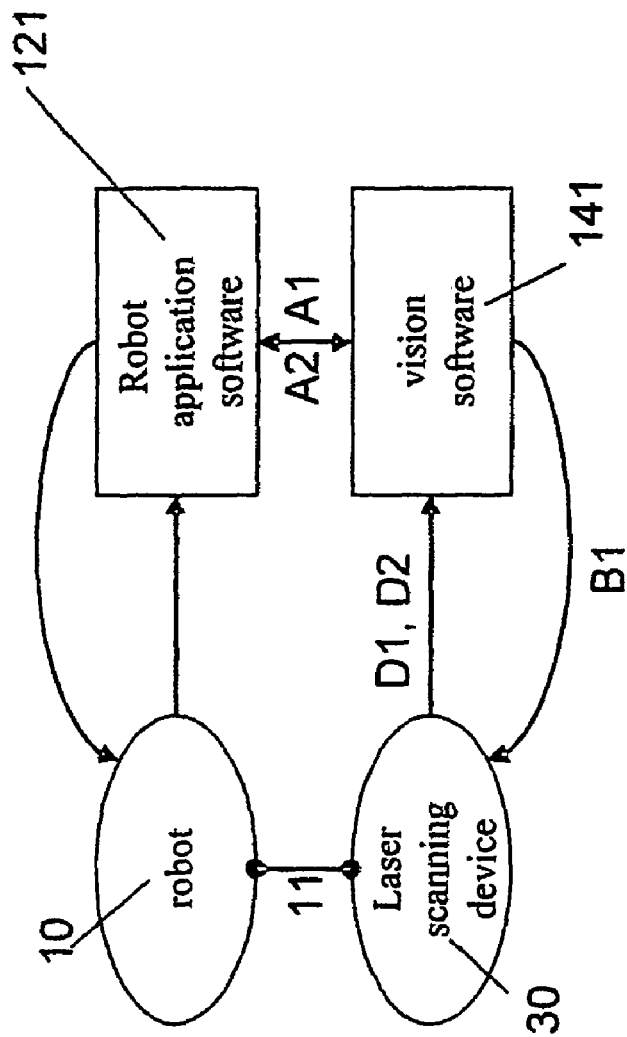
FIG. 2 shows an example of the data interchange between the robot, the laser scanning apparatus and the image processing software.

By way of example, FIG. 2 shows the data interchange between the robot 10, the laser scanning apparatus 30 which is connected to the robot arm 11, and the image processing software 141 which is integrated in the data processing device 40, with the image processing software 141 producing appropriate commands B1 to control the laser scanning apparatus 30.

The analysis module for determination and storage of the coordinates of the defect locations, and the localization module for determination of the spatial arrangement of the defects in the weld seam 21, are integrated in the image processing software 141.

Once the weld seam 21 has been scanned at a predeterminable frequency by means of the laser scanning apparatus 30, the scan signals D1 and the recorded time at which a defective scan point was scanned, also referred to as the time signal D2, are transmitted to the image processing software 141, and the coordinates of the defect locations are identified and evaluated. The velocity profile A1 of the movement apparatus that is required for evaluation while the weld seam 21 is being scanned is produced for the analysis module by the application software 121 for the control unit 12 for the robot 10. The application software 121 for the control unit 12 is also intended to transmit a command to the image processing software 141 in order to start processing the information produced by the scan.

The localization module determines the spatial arrangement of the defects in the weld seam 21 from the time signal D2, which is associated with each of the defective scan points, the coordinates of the defect locations produced by the analysis module, and the evaluation of the velocity profile A1 of the movement of the robot arm 11 during the scans.

A signal A2 which characterizes the determined spatial arrangement of the defects in the weld seam 21 is transmitted to the application software 121 for the control unit 12 for the robot 10 for further processing, for example in order to control the robot arm 11 for repairing the weld point 21.

The control signals B1 which are required to operate and control the laser scanning apparatus 30 are optionally produced by the image processing software 141.

The application software 121 for the control unit 12 for the robot 10 communicates with the image processing software 141 using a standardized XML interface, which interchanges data by transmission of information using the XML format between the control unit 12 for the robot 10 and the image processing software 141.

The standardized XML interface therefore makes it possible for scanning apparatuses 30 and robot controllers 12 from different manufacturers to communicate with one another without any need for complex new or supplementary programming of the image processing software 141.

Figure 3:
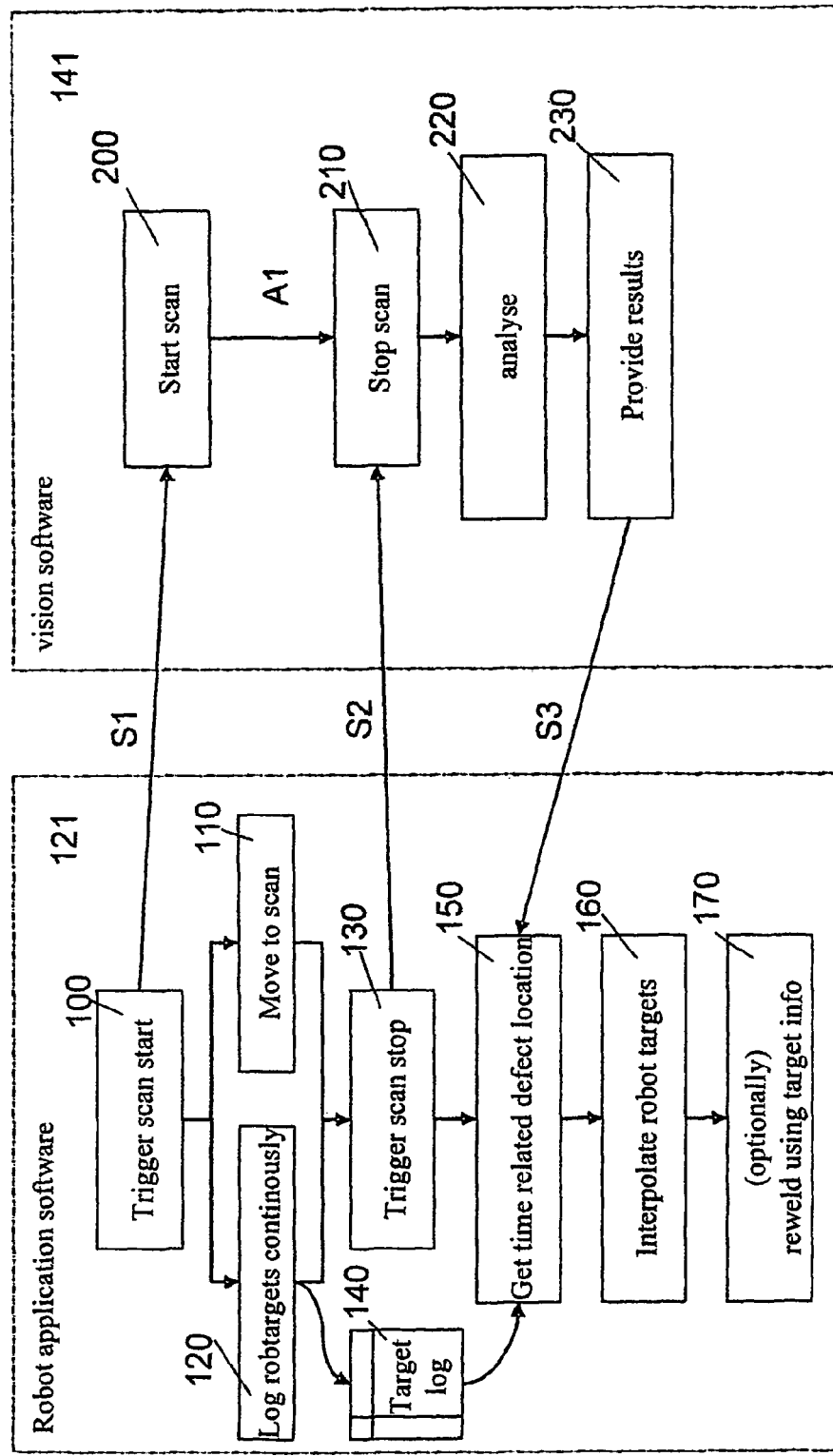
FIG. 3 shows an example of the method procedure for identifying defects in weld seams in a workpiece.

FIG. 3 uses an example of a method procedure for identifying defects in weld seams in a workpiece to illustrate the data interchange between the application software 121 for the control unit 12 of the robot 10 and the image processing software 141 integrated in the data processing device 40.

In a first step 100, the application software 121 starts to initiate the scan of the weld seam 21, and sends a corresponding signal S1 to the image processing software 141.

In a second step 110, the robot arm 11 is moved over the weld seam 21 to be scanned.

Alternatively, in a step 120, the robot arm 11 can be moved continuously over the weld seam 21 in order to record defects over a plurality of scans, and to store them in a record in a fourth step 140.

After completion of the scan in a third step 130, a further signal S2 is transmitted to the image processing software 141.

The application software 121 now interacts with the image processing software 141 such that the velocity profile A1 which is required for evaluation is processed from the start of the scan S1 and the end of the scan S2 in program steps 210 and 220 by the image processing software 141.

In a further program step 230, the image processing software 141 uses the information used by the scanning apparatus 30 to determine the coordinates of the defect locations and, from this, and taking account of the velocity profile A1 produced by the application software for the scan, determines the spatial arrangement of the defects in the weld seam 21.

In a final program step 240, the information relating to the spatial arrangement of the defect S3 in the weld seam 21 is transmitted on-line to the application software 121 which, in a fifth step 150 and taking account of the scans recorded in the third step 130 or alternatively in the fourth step 140, processes this to produce a time-related defect location in the weld seam 21.

In a sixth step 160, the discrepancies from the predetermined shape of the weld seam 21 are identified, and are used to control the robot arm 11.

A final step 170 optionally provides for the information obtained in the penultimate step 160 relating to the spatial extent of the defect to be used to repair the weld seam 21.

Figure 4:
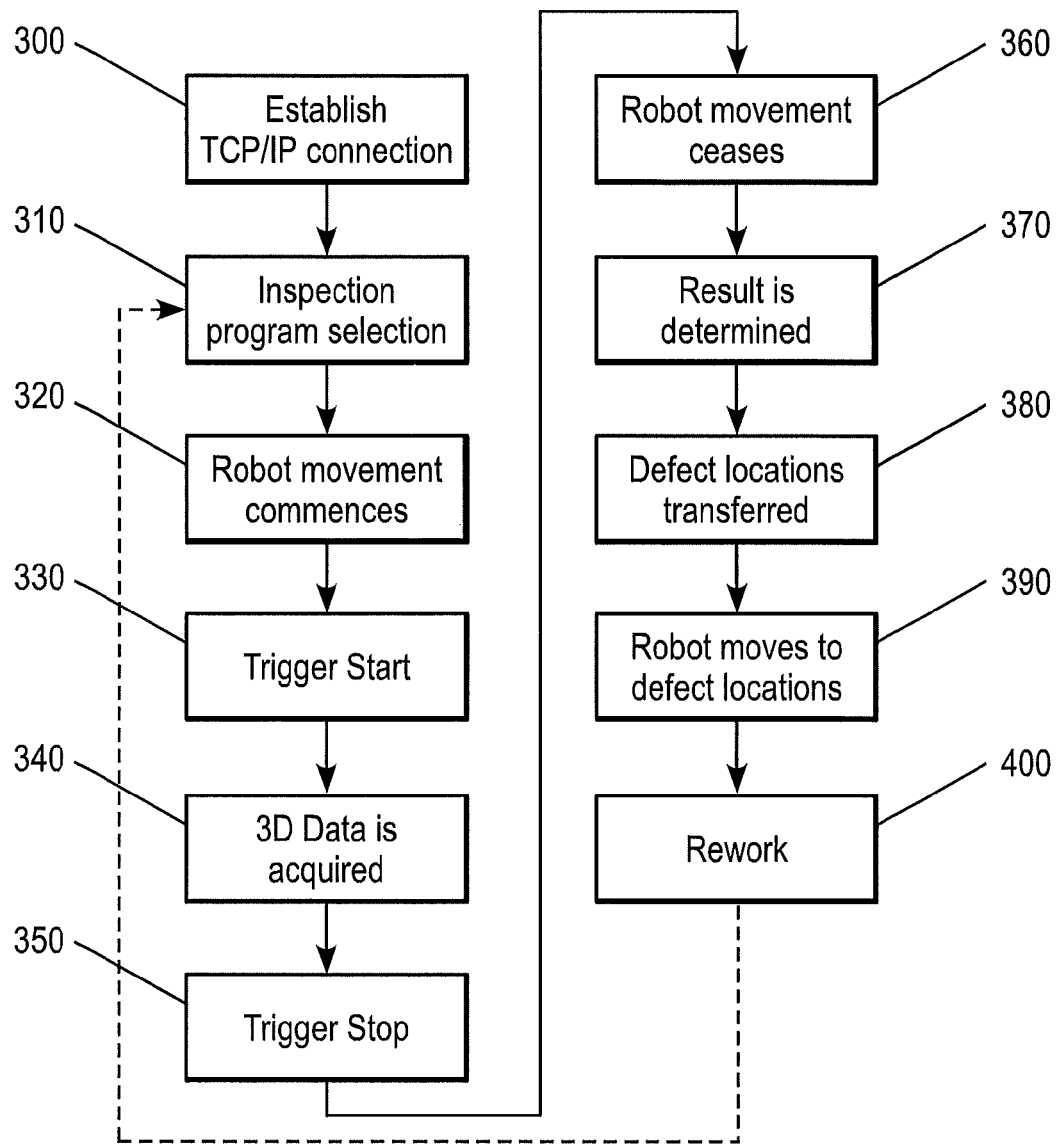
FIG. 4 shows, by way of example, the communication between the control unit for the robot and the data processing device via an Ethernet network link.

By way of example, FIG. 4 shows the communication between the control unit 12 for the robot 10 and the data processing device 40, with the control unit 12 for the robot 10 communicating with the PC 40 via an Ethernet network link.

As soon as a TCP/IP (Transmission Control Protocol over Internet Protocol) link has been set up in a first method step 300, a corresponding defect detection program is selected and installed by means of the control unit 12 in a second method step 310.

In a third method step 320 once the application software 121 has been started, the robot arm 11 moves the scanning apparatus 30 at a predeterminable velocity, for example at 100 mm/s along the weld seam 21.

At the same time, in a fourth method step 330, the image processing software 141 simulates the scan (which is carried out on a transversely running line) of the scanning apparatus 30 over the weld seam 21, with the frequency of the scan of the weld seam 21 being 500 Hz.

In a fifth method step 340, the scanned line is collated with the information relating to the defect locations to form a three-dimensional weld seam profile, from which the discrepancies from the predetermined shape of the weld seam 21 can be identified.

Once the scan has been completed in the sixth method step 350 and the movement of the robot arm 11 has been adjusted in a seventh method step 360, the image processing software 141 analyzes, in a filtering method step 370, the weld seam profile determined by the scanning apparatus 30 and, in a further method step 380, the information relating to the defects in the weld seam 21 is transmitted to the control unit 12 for the robot 10, for example following a request.

In a final method step, the movements of the robot arm 11 are matched to the determined defect locations, so that, in an additional method step 400, the robot 10 is able to carry out repairs on the weld seam 21 by means of its robot arm 11.

LIST OF REFERENCE SYMBOLS

10 Processing device, machine tool, robot
11 Robot arm
12 Control unit
20 Workpiece
21 Weld seam
30 Scanning apparatus, laser scanning apparatus
40 Data processing device
141 Image processing software
121 Application software
A1 Velocity profile of the movement apparatus
A2 Signal which characterizes the determined spatial arrangement of the defect locations on the weld seam 21
B1 Control signals
D1 Scan signals
D2 Recorded time of the scan
S1 "Start of scan" signal
S2 "End of scan" signal
S3 Information about the spatial arrangement of the defect in the weld seam.

The invention claimed is:

1. A defect detection system for identifying defects in weld seams comprising:
    a scanning apparatus which is fitted to a movement apparatus of a processing device, with the scanning apparatus being moveable by the movement apparatus over at least one weld seam to be examined, wherein the scanning apparatus scanning the weld seam at a predeterminable frequency, each scan being correlated with a time signal, with the time of the scanning of at least one defect location being recorded with the time signal;
    an analysis module for determining the coordinates of the defect locations from the scan signals obtained by the scans, the analysis module storing the coordinates of the defect locations; and
    a localization module for determining a distance between the defect locations along the weld seam by evaluation of a velocity profile of the movement apparatus during the scans, of the time signals associated with the defect locations, and of the coordinates of the defect locations produced by the analysis module.

2. The defect detection system as claimed in claim 1, wherein the localization module is connected to a control unit for the processing device, which control unit further processes the determined distance between the defect locations along the weld seam.

3. The defect detection system as claimed in claim 2, wherein the control unit for the processing device further processes the distance between the defect locations along the weld seam by application software.

4. The defect detection system as claimed in claim 2, wherein the control unit for the processing device produces the time signal and/or a signal which characterizes the velocity profile of the movement apparatus.

5. The defect detection system as claimed in claim 1, wherein the scanning apparatus is a laser scanning apparatus.

6. The defect detection system as claimed in claim 1, wherein defects are recordable over a plurality of scans.

7. The defect detection system as claimed in claim 1, wherein the processing device is a machine tool or a robot system, in particular a welding robot system.

8. The defect detection system as claimed in claim 1, wherein the frequency can be predetermined by the scanning apparatus.

9. The defect detection system as claimed in claim 1, wherein the frequency for scanning the weld seam is 500 Hz.

10. The defect detection system as claimed in claim 1, wherein the analysis module and the localization module form image processing software which is integrated in a data processing device.

11. The defect detection system as claimed in claim 1, wherein the analysis module and the localization module are integrated in a data processing device, which communicates with the control unit for the processing device via a standardized XML (extensible Markup Language) interface.

12. The defect detection system as claimed in claim 1, wherein the scanning apparatus can be moved at a uniform predeterminable velocity.

13. A method for identifying defects in weld seams, using a scanning apparatus which is fitted to a movement apparatus for a processing device being moved at a defined velocity over at least one weld seam to be examined, the method comprising:

- scanning the weld seam by the scanning apparatus at a predeterminable frequency, and relating each scan to an associated time signal, with the time of the scanning of at least one defect location being recorded with the time signal;
- determining and storing the coordinates of the defect locations by an analysis module from the scan signals obtained by the scans; and
- determining a distance between the defect locations along the weld seam by a localization module by evaluation of a velocity profile of the movement apparatus during the scans, of the time signals associated with the defect locations, and of the coordinates of the defect locations produced by the analysis module.

14. The method as claimed in claim 13, comprising:
transmitting the determined distance between the defect locations along the weld seam to a control unit for the processing device, for further processing.

15. The method as claimed in claim 14, comprising:
processing the distance between the defect locations along the weld seam by application software in the control unit for the processing device.

16. The method as claimed in claim 13, comprising:
recording locations over a plurality of scans.

17. The method as claimed in claim 13, wherein a time signal and/or a signal which characterizes the velocity profile of the movement apparatus are/is produced by the control unit for the movement apparatus.

18. The method as claimed in claim 13, wherein the frequency is predetermined by the scanning apparatus.

19. The method as claimed in claim 13, wherein the analysis module and the localization module are integrated as image processing software in a data processing device.

20. The method as claimed in claim 13, wherein the analysis module and the localization module are integrated in a data processing device, which communicates with the control unit for the processing device via a standardized XML (extensible Markup Language) interface.

21. The method as claimed in claim 13, wherein the scanning apparatus is moved at a uniform predeterminable velocity.

\* \* \* \* \*